United States Patent [19]
Mueller

[11] Patent Number: 5,909,912
[45] Date of Patent: Jun. 8, 1999

[54] METHODS FOR INSTALLING A GOLF CLUB GRIP ONTO A GOLF CLUB SHAFT

[75] Inventor: Bernard K. Mueller, Booneville, Ark.

[73] Assignee: Sealwrap Systems LLC, Indianapolis, Ind.

[21] Appl. No.: 08/934,956

[22] Filed: Sep. 22, 1997

[51] Int. Cl.$^6$ .................................................. B23P 11/02
[52] U.S. Cl. ............................ 29/446; 29/450; 473/300
[58] Field of Search ........................... 29/446, 450, 235; 473/300

[56] References Cited

U.S. PATENT DOCUMENTS

| | | | |
|---|---|---|---|
| D. 307,169 | 4/1990 | Aldridge | D21/222 |
| D. 322,637 | 12/1991 | Aldridge | D21/222 |
| 4,070,746 | 1/1978 | Evans et al. | 29/450 |
| 4,293,201 | 10/1981 | Fukuda et al. | 351/178 |
| 4,346,890 | 8/1982 | Kaminstein | 273/73 |
| 4,391,661 | 7/1983 | Izraeli | 156/49 |
| 4,401,218 | 8/1983 | Erlichman | 206/446 |
| 4,552,713 | 11/1985 | Cavicchioli | 264/162 |
| 4,607,866 | 8/1986 | Erlichman | 174/DIG. 8 |
| 4,714,277 | 12/1987 | Bachel et al. . | |
| 4,819,939 | 4/1989 | Kobayashi | 273/81 |
| 4,865,890 | 9/1989 | Erlichman | 174/DIG. 8 |
| 4,912,836 | 4/1990 | Avetoom | 29/450 |
| 5,098,752 | 3/1992 | Chang et al. | 428/34.9 |
| 5,343,776 | 9/1994 | Falco et al. | 74/558 |
| 5,373,616 | 12/1994 | Biersdorf et al. | 29/450 |
| 5,406,871 | 4/1995 | Lambert, Jr. | 138/103 |
| 5,407,026 | 4/1995 | Vald'via | 184/82 |
| 5,419,031 | 5/1995 | McLendon | 29/450 |
| 5,429,706 | 7/1995 | Cresse et al. | 156/356 |
| 5,524,885 | 6/1996 | Heo | 473/299 |
| 5,571,050 | 11/1996 | Huang | 273/73 |
| 5,584,482 | 12/1996 | Huang | 273/75 |
| 5,730,662 | 3/1998 | Rens | 473/300 |
| 5,801,333 | 9/1998 | Jones | 174/74 A |

OTHER PUBLICATIONS

Amoco® Product Description: Amoco® Polybutenes—Physical Properties, Bulletin 12–23d (Date Unknown).

Exxon® Product Decription: Isopar® Solvents Offer Extraordinary Versatility for Many Uses (Date Unknown).

*Primary Examiner*—David P. Bryant
*Attorney, Agent, or Firm*—Woodard, Emhardt, Naughton, Moriarty & McNett

[57] ABSTRACT

The present invention relates generally to grips for sports equipment such as golf clubs, tennis racquets, baseball bats and the like and relates to swelling solvents and the use of swelling solvents to expand a generally tubular or cylindrical elastomeric article, such as, for example, a golf club grip. In accordance with the invention, the expanded elastomeric article may be fitted over an elongate article, such as a grip-receiving portion of a golf club shaft, and contracted by evaporating the swelling solvent therefrom to bring the elastomeric article into tight contact with the elongate article.

34 Claims, 1 Drawing Sheet

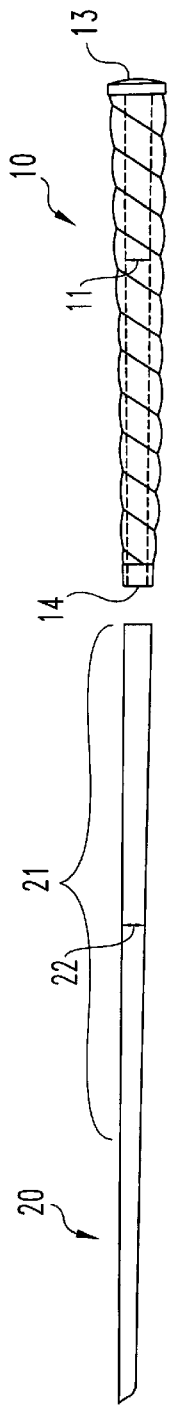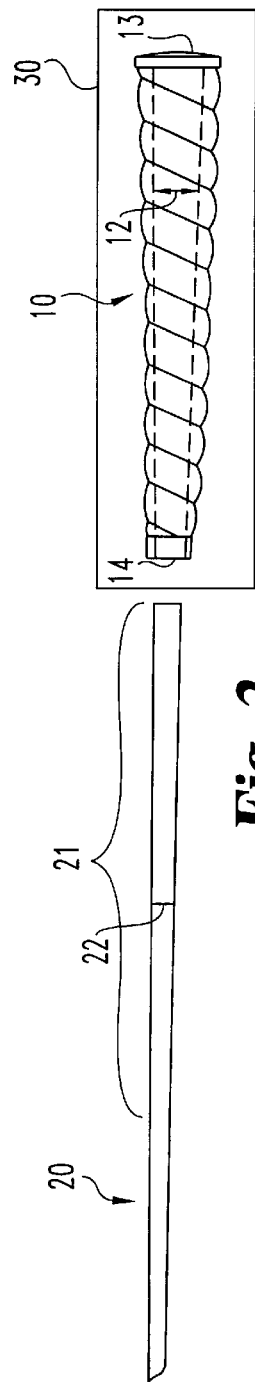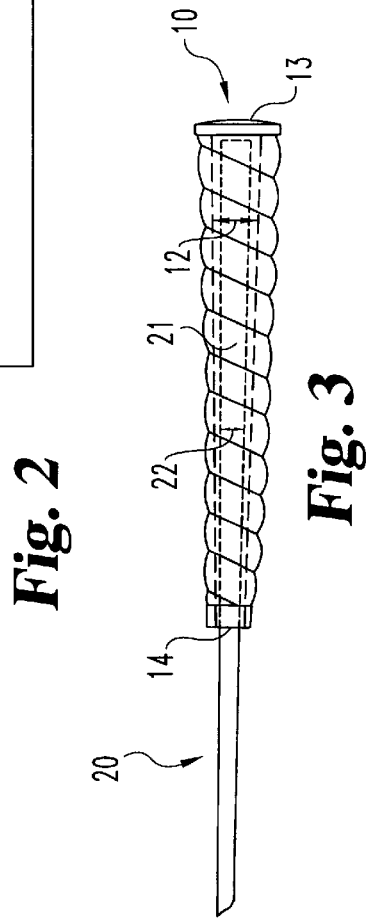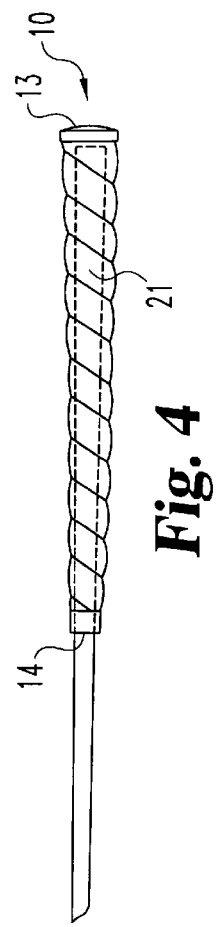

METHODS FOR INSTALLING A GOLF CLUB GRIP ONTO A GOLF CLUB SHAFT

BACKGROUND OF THE INVENTION

1. Field of the Invention

The present invention relates generally to grips for sports equipment such as golf clubs, tennis racquets, baseball bats and the like and relates to swelling solvents and the use of swelling solvents to expand a generally tubular or cylindrical elastomeric article, such as, for example, a golf club grip. In accordance with the invention, the expanded elastomeric article may be fitted over an elongate article, such as a grip-receiving portion of a golf club shaft, and contracted by evaporating the swelling solvent therefrom to bring the elastomeric article into tight contact with the elongate article.

2. Discussion of Related Art

A large and diverse number of sports equipment grips have been previously described, such as, for example, those disclosed in U.S. Pat. No. 4,878,667 to Tosti; U.S. Pat. No. 4,819,939 to Kobayashi; U.S. Pat. No. 4,346,890 to Kaminstein; U.S. Pat. No. 5,343,776 to Falco et al.; U.S. Pat. Nos. 5,571,050 and 5,584,482 to Huang; U.S. Pat. No. 5,524,885 to Heo; and U.S. Pat. No. 4,912,836 to Avetoom. Those in current use, however, are often made of a single piece of tubular, non-porous, vulcanized or molded rubber. For example, conventional golf club grips are typically molded from a single piece of rubber or synthetic plastic, and are one-piece, hollow, preformed, and conical in appearance. The larger end is substantially or completely closed, while the smaller end is open and reveals the hollowness of the grip. The hollowness of the grip is mandatory so that the insertion of the golf club shaft into this recess can occur. This described golf club grip typically has an inside diameter, i.e., a recess diameter, that is substantially the same as the circumference of the shaft to which it is to be attached. The grip is slipped onto a golf club shaft in a manner that requires an adhesive, such as two-way tape, and a petroleum-based agent, such as lighter fluid or the like.

In a conventional manner of attaching such a preformed golf club grip to the shaft of a club, the shaft area that is to receive the golf club grip has the two-way tape or adhesive applied thereto. Then, the petroleum-based agent is applied to the cavity of the grip and also poured over the tape. This procedure causes the adhesive and the grip wall to become slick so that the bored small end of the golf club grip can be slipped over the top of the taped or adhesive-laden shaft. Then, the grip can be subsequently slipped down the shaft until the end of the shaft abuts against the covered or semi-covered end of the golf club grip. After the liquid petroleum-based agent evaporates, the golf club grip becomes permanently attached to the golf club shaft by the binding action of the tape or glue. Alternative approaches to attaching a grip to a golf club shaft are disclosed in U.S. Pat. No. 5,419,031 to McLendon, U.S. Pat. No. 4,899,428 to Hsu, U.S. Patent No. 5,407,026 to Vald'via and U.S. Pat. No. 5,429,706 to Cresse et al.

A serious disadvantage of conventional golf club grips is that the grips need to be replaced periodically. This is necessary due to the fact that these grips wear and harden with use and thus lose their tackiness. Consequently, the entire grip has to be replaced relatively often, which involves cutting, scraping, and the use of adhesives, clamps and other specialized equipment. This process is wasteful, time consuming, inconvenient and expensive. Additionally, the re-gripping of, for example, a golf club may not typically be done by the golfer himself or herself, and usually means leaving the club at an equipment facility and returning to collect it. It is expensive and inconvenient, and it is a process that often has to be repeated at regular intervals.

Another disadvantage of conventional golf club grips is their tendency to become slippery when dampened, as for example, when playing under rainy conditions or by contact with perspiration formed on the golfer's hands. Slippery contact of a golfer's hands with a golf club grip reduces his feel of the golf club.

In light of the above, there has been a long-felt need for a simple, fast, economical and efficient way of re-gripping, for example, a golf club, and this need has so far not been satisfied. The present invention overcomes the above-described problems by providing a non-slip grip or handle which may be readily and quickly attached to, for example, a golf club shaft. Golf club grips made in accordance with the invention may be attached to a golf club by the golfer himself or herself, thereby eliminating the inconvenience and delay caused by the time-consuming and labor intensive manner of re-gripping clubs using prior art techniques.

Also provided by the invention are methods and compositions for increasing the tackiness of, for example, a golf club grip, this overcoming a long-felt need for grips which do not become slippery when dampened.

In addition to the re-gripping of golf clubs, there are also a wide variety of situations where it is advantageous or necessary to tightly fit an elastomeric sleeve over an elongate article, for example, to seal a joint, to electrically insulate, or perhaps to prevent corrosion of the elongate article if it is exposed to the elements. Particularly advantageous uses involve automotive, residential and industrial heating and cooling units, wherein it is often difficult to prevent leakage of gases and liquids therefrom. Examples of methods and devices used in the prior art to expand an elastomeric sleeve are set forth in U.S. Pat. No. 5,406,871 to Lambert et al., U.S. Pat. No. 5,098,752 to Chang et al. and U.S. Pat. No. 4,391,661 to Izraeli. Introducing a tight-fitting elastomeric sleeve over an elongate article using methods and devices of the prior art, however, requires the manufacture of complex devices which are difficult to handle and expensive. Therefore, there is also a need for improved methods for introducing a tightfitting elastomeric sleeve over an elongate article. Such are provided by the present invention.

SUMMARY OF THE INVENTION

In accordance with the invention, there is provided a method for making a preformed elastomeric sleeve for being tightly attached onto an elongate article, comprising (1) providing a generally tubular elastomeric sleeve having a substantially open first end; the first end providing access to a recess within the sleeve, the recess being formed to receive the article; the recess having first inside dimensions from about 0% to about 30% less than the outside dimensions of the article; and (2) causing the elastomeric sleeve to expand by contacting the sleeve with a liquid swelling solvent comprising an isoparaffin and a hydrochlorofluorocarbon, thereby providing a sleeve having a second inside dimension; wherein the second inside dimension is at least as large as the outside dimension of the article.

In another aspect of the invention, there is provided a method for attaching a preformed elastomeric sleeve directly onto an elongate article, comprising (1) providing an elongate article having predetermined outside dimensions; (2) providing a generally tubular elastomeric sleeve having a substantially open first end; the first end thereby providing access to a recess within the sleeve, the recess being formed to receive the article; the recess having inside dimensions at least as large as the outside dimensions of the article; wherein the elastomeric sleeve has absorbed therein a liquid swelling solvent comprising an isoparaffin and a hydrochlorofluorocarbon; (3) positioning the sleeve to have an orientation with respect to the article whereby the article resides in the recess; and (4) maintaining the orientation for a period of time which enables the solvent to evaporate from the sleeve, the evaporating causing the sleeve to contract, thereby causing the sleeve to come into intimate contact with the article and to become attached to the article by friction between the sleeve and the article.

According to another aspect of the invention, there is provided a method for attaching a preformed golf club grip directly onto an outer surface of a golf club shaft, comprising (1) providing a golf club shaft comprising a grip-receiving portion positioned at the first end of the shaft and having a predetermined diameter (2) providing a generally tubular golf club grip with a first end substantially closed and a second end substantially open; the second end thereby providing access to a recess within the tubular grip, the second end and the recess formed to receive the grip-receiving portion; the recess having an inside diameter at least as large as the diameter of the grip-receiving portion of the shaft; wherein the grip comprises an elastomeric composition having absorbed therein a liquid swelling solvent; (3) inserting the grip-receiving portion of the golf club shaft into the recess so that the shaft and the grip have an orientation whereby the first end of the grip is substantially adjacent the first end of the shaft; and (4) maintaining the orientation for a period of time which enables the solvent to evaporate from the elastomeric composition, the evaporating causing the elastomeric composition to contract, thereby causing the grip to come into intimate contact with the shaft and to become attached to the shaft by friction between the grip and the shaft.

In accordance with another aspect of the invention, there is provided a swelling solvent for swelling a golf club grip to attach the grip to a grip-receiving portion of a golf club shaft, comprising an isoparaffin composition and a hydrochlorofuorocarbon; the swelling solvent having a solubility parameter of from about 5.0 to about 10.4, a vapor pressure of at least about 20 mm Hg at 38° C. and a flash point greater than about 0° C.

It is an object of the invention to provide a golf club grip which may readily be attached to a golf club grip by the golfer himself or herself without the need for extensive training and expensive equipment and materials.

It is also an object of the invention to provide a golf club grip which may be removed from a golf club without the need for expensive equipment, solvents and other cleaning compositions.

It is a further object of the invention to provide a method of attaching a golf club grip to a golf club quickly and inexpensively.

It is another object of the invention to provide a solvent which is useful to expand an elastomeric sleeve to attach the sleeve to an elongate article.

It is also an object of the invention to provide a manner of affixing an elastomeric sleeve onto an elongate article quickly and efficiently.

Further objects, advantages and features of the present invention will be apparent from the detailed description herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

FIG. 1 is a side elevation of a golf club shaft and a grip to be mounted thereon, the grip being in its unexpanded state.

FIG. 2 is a similar view of a golf club shaft and grip with the grip in its expanded state.

FIG. 3 is a similar view of the grip in its expanded state but having the grip-receiving portion of a golf club shaft placed within the recess of the grip.

FIG. 4 is a similar view showing the completed grip and club assembly.

DETAILED DESCRIPTION OF PREFERRED EMBODIMENTS

For purposes of promoting an understanding of the principles of the invention, reference will now be made to particular embodiments of the invention and specific language will be used to describe the same. It will nevertheless be understood that no limitation of the scope of the invention is thereby intended, such alterations and further modifications in the invention, and such further applications of the principles of the invention as described herein being contemplated as would normally occur to one skilled in the art to which the invention pertains.

The present invention relates in one respect to an improved manner of attaching a golf club grip to a golf club shaft. This aspect of the invention finds advantageous use at the manufacturing level, wherein an original grip is attached to a new golf club prior to introducing the new club to the market. An additional advantageous use relates to the replacement of an old grip by a golfer, for example, when the grip affixed to a golf club becomes worn, hardened, torn and/or slick.

Additionally, it is well understood by those who play golf that the tackiness of a grip is an important feature which, if absent, results in difficulty controlling the swing of the club and, therefore, controlling the accuracy of a given golf shot. As such, another aspect of the invention involves compositions and methods for increasing the tackiness of a golf grip by impregnating the grip with a polymeric composition. Increased tackiness characteristics of a grip may also be provided either at the manufacturing level or by a golfer at home. Inventive compositions and methods for increasing the tackiness of a grip are advantageously used while attaching a new grip to a club.

While the preferred embodiments described in detail herein relate particularly to golf club grips, it is to be understood that the invention is not limited thereto. Rather, the principles of the invention include attachment of a wide variety of elastomeric sleeves to elongate articles, not limited by the size or shape of the article.

A grip selected for use in accordance with the present invention comprises an elastomeric material and may be made according to methods known in the art for forming elastomeric articles. While a grip used in accordance with the invention may be configured in a wide variety of shapes, representative examples of suitable shapes are set forth in U.S. Design Pat. No. Des. 322,637 to Aldridge and U.S. Design Pat. No. Des. 307,169 to Aldridge, which patents, along with all other patents cited herein, are incorporated herein by reference in their entirety. Suitable grips may be formed with or without slits, ridges, contours and the like.

Referring to the drawings, a grip 10 selected for use in accordance with the invention preferably has a first substantially closed end 13 and a second substantially open end 14; the second end 14 thereby providing access to a recess within the tubular grip. The second end 14 and the recess are formed to receive a grip-receiving portion 21 of a golf club shaft 20 in accordance with the invention. It is a critical feature of a grip 10 selected for use in accordance with the invention that it have an initial inside diameter 11 that is from about 0% to about 30% smaller than the diameter 22 of the grip-receiving portion 21 of the golf club shaft 20 to which the grip 10 is being attached. More preferably, the grip 10 has an inside diameter 11 that is from about 2% to about 25% smaller than the diameter 22 of the grip-receiving portion 21 of the golf club 20, most preferably, from about 4% to about 20%. For purposes of describing the invention, the term "inside diameter," 11 as used in connection with a grip 10, is intended to refer to the diameter of the recess within the hollow grip. The term "grip-receiving portion" 21 of the golf club refers to the portion of the shaft 20 to which the grip 10 is attached, i.e., the portion at the end of the shaft opposite the club head.

The inside diameter criterion is an important feature of the invention because a grip 10 to be attached to a shaft 20 is prepared by swelling the elastomeric grip by introducing a swelling solvent to the grip, thereby increasing the inside diameter of the grip, so that the shaft may be inserted into the grip. With the grip-receiving portion of a shaft located within the recess of the grip, as the swelling solvent evaporates from the grip, the elastomeric material contracts, thereby becoming tightly contacted with the shaft. It is understood that, in the absence of a shaft within the recess, the elastomeric grip will contract to substantially the same size and shape that it possessed prior to introduction of the swelling solvent (i.e., prior to expanding the grip). When a shaft is present in the expanded grip at the time the solvent evaporates, however, the inside surface of the grip, i.e., the surface of the elastomeric composition adjacent the recess, will contract only to the point wherein the inside diameter of the grip comes into contact with the shaft. Further evaporation of the solvent from the grip will result in elastomeric tension, thereby attaching the grip firmly to the shaft. Thus, upon contracting, the grip is in tight contact with the shaft and will remain attached thereto by friction caused by elastomeric tension.

A grip 10 selected in accordance with the invention, therefore, comprises an elastomeric material which swells when placed in a suitable swelling solvent. If it is not known whether a particular material falls within the scope of the invention, a determination may be readily made without undue experimentation by testing the swelling characteristics of the material. In this respect, a preferred grip used in accordance with the invention comprises an elastomeric material having a solubility parameter of from about 7.0 to about 8.4. More preferably, the elastomeric material selected for use in accordance with the invention has a solubility parameter of from about 7.2 to about 8.2, most preferably from about 7.4 to about 8.0. The term "solubility parameter" as used herein is intended to have its accepted meaning in the field of polymer chemistry. Briefly, quantitative solubility data for nonpolar organic compounds may be calculated from the Hildebrand expression for the square root of the cohesive energy density which is defined as the solubility parameter. The critical solubility parameter range for nonpolar polymers in nonpolar liquids is believed to be less than about 2 Hildebrand units (H) at temperatures below about 50° C. The calculated solubility parameter of a compound can be used to predict the solubility of most compounds in most solvents, particularly to the extent that the compounds and solvents are nonpolar.

One preferred elastomer which has excellent characteristics for use in accordance with the invention is an ethylene-propylene terpolymer. The term "ethylene-propylene terpolymer" is used herein to designate an elastomer based on stereospecific linear terpolymers of ethylene, propylene, and a relatively small amount of a nonconjugated diene such as, for example, hexadiene, dicyclopentadiene, or ethylidene norbornene, which elastomer may be swelled using a swelling agent selected in accordance with the invention. It is intended that this list of conjugated dienes be illustrative in nature and not be limiting of the invention. The unsaturated part of the polymer molecule is typically pendant from the main chain, which is substantially saturated. The ethylene-propylene terpolymer selected in accordance with the invention preferably has a solubility parameter within the preferred ranges. It is readily understood that variations in an ethylene-propylene terpolymer may occur which do not eliminate the advantageous properties described herein. It is expressly intended that such variations fall within the scope of the invention.

In a preferred aspect of the invention, the elastomer selected as the base polymer of an inventive grip is an ethylene propylene diene monomer ("EPDM"). As used herein, the term "EPDM" is intended to refer to a polymer which includes ethylene monomers, propylene monomers and diene monomers and which may be swelled using a swelling solvent selected in accordance with the invention. It is understood that EPDM may have varying ratios of these monomers and also may include additional monomers. It is preferred that the specific EPDM selected for use have a solubility parameter within the preferred ranges. It is expected that EPDM polymers having a wide variety of such ratios will find advantageous use in the invention. Furthermore, if it is not known whether a particular EPDM falls within the scope of the invention, a determination of its swellability characteristics may readily be determined without undue experimentation.

Another preferred class of elastomers finding advantageous use in accordance with the invention are butyl rubbers. As used herein, the term "butyl rubber" is intended to refer to an elastomer which is made by polymerizing butylene monomers and which has a solubility parameter within the preferred ranges set forth above. One example of a butyl rubber used in a preferred embodiment of the invention is polyisobutylene. Inventive grips may also be made using a silicone rubber, or silicone elastomer. The term "silicone rubber" is used herein to refer to non-fluorinated silicone rubbers. Fluorinated silicone rubbers are not particularly useful in accordance with the present invention because of disadvantageously high solubility parameters. Examples of silicone rubbers are set forth in U.S. Pat. No. 4,552,713 to Cavicchioli. A preferred silicone rubber or butyl rubber selected for use in accordance with the invention has a solubility parameter within the preferred ranges set forth above. A preferred silicone rubber contains methyl and/or phenyl groups attached to the silicon atoms of the silicone polymers.

A swelling solvent selected for use in accordance with the invention is one which swells a polymer selected for use therewith and which is preferably non-carcinogenic. In a preferred aspect of the invention, the swelling solvent has a solubility parameter of from about 5.0 to about 10.4. More preferably, the swelling solvent selected for use in accordance with the invention has a solubility parameter of from about 6.1 to about 9.5, most preferably from about 7.2 to about 8.5. For purposes of increasing the safety of handling solvents used in accordance with the invention, it is also preferred, though not critical to the invention, that the solvent have a flash point greater than about 0° C., more preferably greater than about 15° C. and most preferably greater than about 25° C. A preferred solvent has a vapor pressure greater than about 20 mm Hg at 38° C., more preferably greater than about 30 mm Hg at 38° C., more preferably greater than about 40 mm Hg at 38° C. and most preferably greater than about 50 mm Hg at 38° C.

In a preferred aspect of the invention, the swelling solvent comprises an isoparaffin composition. Preferably, at least about 25% of the swelling solvent is an isoparaffin composition, more preferably at least about 50% and most preferably at least about 75%. A preferred isoparaffin composition selected for use in accordance with the invention is the synthetically produced isoparaffinic solvents bearing the brand name ISOPAR®. In a preferred aspect of the invention, the isoparaffin composition has a solubility parameter and a vapor pressure within the preferred ranges set forth above. ISOPAR® solvents are available commercially from Exxon Chemical Company (Houston, Tex.). Preferably, the isoparaffin composition comprises at least about 50% ISOPAR C® by volume. More preferably, the isoparaffin composition comprises ISOPAR C® and ISOPAR E®. In a preferred aspect of the invention, the isoparaffin composition comprises from about 5% to about 95% ISOPAR C® and about 5% to about 95% ISOPAR E®, more preferably at least about 70% ISOPAR C® and up to about 30% ISOPAR E®, most preferably at least about 80% ISOPAR C® and up to about 20% ISOPAR E®.

One disadvantage of, for example, a high purity ISOPAR C®/ISOPAR E® solvent composition is that the flash point of such a mixture ranges from about −7° C. to about 7° C. Therefore, in one preferred embodiment of the invention, a hydrochlorofluorocarbon ("HCFC") is included in the solvent at a percent composition of up to about 75% HCFC by volume. More preferably, the solvent is from about 5% to about 50% HCFC, and most preferably, from about 5% to about 30% HCFC. The presence of HCFC advantageously increases the flash point of the solvent, and HCFCs are also non-carcinogenic, making them suitable for use in preferred solvents.

In another aspect of the invention, the solvent also has dissolved therein a polybutene polymer. When a swelling solvent having polybutene therein is used to expand a golf grip in accordance with the invention, polybutene molecules impregnate the expanded elastomeric material. Subsequently, when the grip is removed from the swelling solvent, the solvent molecules, such as for example, ISOPAR® and/or HCFC molecules, evaporate from the elastomeric grip, leaving behind polybutene dispersed in the contracted elastomeric matrix. The polybutene thereby is integrally associated with the elastomeric matrix and provides a tackiness characteristic to the grip, adding to the excellent feel provided to a golfer using a golf club having the grip attached thereto. The polybutene used in this manner is preferably a polybutene having a Kinematic viscosity (ASTM D445) of less than about 80 cSt at 38° C., more preferably less than about 65 cSt at 38° C. and most preferably less than about 50 cSt at 38° C. Polybutenes advantageously used in accordance with the invention are readily available commercially from AMOCO® Chemicals (Chicago, Ill,).

To practice a preferred method of attaching a grip to a shaft in accordance with the invention, a swelling solvent is made or provided which has an overall solubility parameter of from about 5.0 to about 10.4. More preferably, the solubility parameter of the swelling solvent from about 6.1 to about 9.5, most preferably from about 7.2 to about 8.5. In a preferred embodiment, the swelling solvent comprises at least about 70% by volume ISOPAR C®, ISOPAR E®, or a mixture of the two. In an alternate embodiment, the swelling solvent also comprises up to about 30% by volume HCFC, the presence of an HCFC increasing the flash point and thus making the swelling solvent safer for consumer use.

Having made or otherwise provided a swelling solvent, an elastomeric grip selected in accordance with the invention is contacted by a preselected amount of the swelling solvent for a period of time sufficient to allow the solvent to swell the elastomeric composition, thereby increasing the internal diameter of the grip. Referring to FIG. 2, which depicts a portion of a golf club shaft 20 and a grip 10 in its expanded state, the post-expanding inside diameter 12 of the grip 10 is at least as large as the diameter 22 of the grip receiving portion 21 of the golf club shaft 20. In this regard, it is understood that the grip receiving portion of a conventional golf club shaft typically has a diameter 22 of about 560 to about 800 thousandths of an inch. It is critical to the invention that the elastomeric composition of which the grip is comprised and the specific composition of the swelling solvent are selected such that the first internal diameter 11 of the grip 10 in its contracted state is from about 0% to about 30% less than the diameter 22 of the grip receiving portion 21 of the shaft 20 (i.e., typically from about 448 to about 640 thousandths of an inch) and that the second internal diameter 12 of the expanded or swelled grip is at least as large as the diameter 22 of the grip receiving portion 21 of the shaft 20. While the elastomeric compositions and solvent compositions described above have been found to achieve this advantageous result, it is expected that additional combinations may be selected which also achieve the result. Furthermore, the ratios of compositions in the swelling solvent may be adjusted to adjust the speed whereby the elastomeric composition expands and contracts. Advantageous ratios may be determined without undue experimentation.

When the grip has been expanded such that the internal diameter of the grip has a diameter at least as large as the diameter of the grip receiving portion of a shaft to which it is to be attached, the shaft is inserted into the recess through the substantially open end of the grip as depicted in FIG. 3. It is preferred that the grip-receiving portion 21 of the shaft 20 be substantially free from debris before being inserted in to the expanded grip 10. By this it is meant that, if the club is being re-gripped, it is preferred that the previous grip be substantially removed along with substantially all of the adhesive used to hold the previous grip in place. The present invention may be satisfactorily practiced using a shaft that is not substantially clean; however, a substantial amount of debris left on the shaft may result in an uneven or lumpy feel to the replacement grip. Of course, when the invention is practiced by, for example, a manufacturer to place an original grip on a new golf club, the removal of debris will not be necessary.

Once the shaft is placed into the recess of the expanded grip, the grip and the shaft are maintained in the desired orientation, i.e., with the end of the shaft being placed substantially adjacent the substantially closed end of the grip, for a period of time sufficient for the solvent to evaporate from the grip, thereby returning the grip to a contracted state. The proper orientation may advantageously be maintained by simply leaning the golf club in an upright position against a work bench or any other suitable object. As the grip returns to its contracted state, the internal diameter of the grip will decrease until the internal surface of the grip is in tight and intimate contact with the grip-receiving portion of the shaft. Further contraction of the elastomeric composition of the grip will result in a tighter fit and, therefore, an increased amount of friction between the grip and the shaft. This functions to hold the grip tightly in place so that it will not slip during normal usage of the golf club.

The period of time necessary for the solvent to evaporate from the elastomeric grip will depend upon the compositions present in the solvent and the ratios thereof. For example, an increased proportion of a composition in the solvent having a high vapor pressure will increase the speed that the solvent will evaporate from the grip and, therefore, that the grip will contract. As stated previously, the ratios of compositions in the solvent may also be selected and/or varied in this manner to adjust the speed of swelling the elastomeric grip. In this regard, in a preferred aspect of the invention, the speed of swelling and contracting may be increased by increasing the proportion of HCFC in the solvent and decreasing the proportion of isoparaffin, and/or polybutene therein. Alternatively, the speed of swelling and contracting may also be decreased by adjusting the proportions of HCFC, isoparaffin and/or polybutene in the solvent in the opposite direction. In this regard, it may be desired to adjust the ratios of starting materials for various applications in which speed of swelling or contraction is important or critical.

As a related matter, it may be desired to use the present invention to attach a grip having a greater thickness to a golf club such as, for example, a putter grip. In this case, it may also be advantageous to adjust the ratio of starting materials such that the thicker layer of elastomeric material will have a satisfactory swelling and contracting rate. Furthermore, a greater amount of swelling solvent will be used in direct proportion with the weight of the elastomeric material. In a preferred aspect of the invention, the ratio of solvent to elastomeric composition is greater than about 0.5:1.0 by weight, more preferably greater than about 0.7:1.0 by weight, and is most preferably about 0.9:1.0 by weight.

In accordance with an alternate preferred embodiment of the invention, the swelling solvent also comprises a polybutene for imparting increased tackiness to a grip. Preferably, the polybutene is a low-viscosity polybutene, i.e., one having a kinematic viscosity (ASTM D445) of less than about 80 cSt at 38° C. More preferably, the polybutene has a kinematic viscosity of less than about 65 cSt at 38° C., most preferably less than about 50 cSt at 38° C. It is also preferred that the polybutene has a minimum flash point of less than about 150° C. and an evaporation loss after 10 hours at 99° C. of at least about 8 wt %, more preferably at least about 10 wt % and most preferably about 12 wt %. An advantageous polybutene selected for use in accordance with the invention is L-14, produced by AMOCO® Chemicals (Chicago, Ill.). It is expected that additional polybutenes having similar molecular weights will also find advantageous use in accordance with the invention, as well as other polymers having similar properties.

In a preferred manner of making a golf grip for being tightly attached to an elongate article, a preformed grip as described herein is placed in an airtight container and substantially all of the air is removed from the container. In FIG. 2, the container 30 is represented schematically. Next, a preferred amount of solvent is introduced into the airtight container such that the elastomeric grip will absorb the solvent and expand a predetermined amount. An elastomeric grip having solvent absorbed therein and packaged in a substantial vacuum as described may be readily shipped and/or stored and will remain in the expanded state so long as the container remains sealed. When the seal is broken, the grip is placed over a shaft quickly because the solvent will immediately begin to evaporate, thereby causing the grip to begin contracting.

It is understood that the disclosed invention has a wide variety of applications beyond attaching a grip to a golf club. There are a number of situations where it is advantageous to introduce an elastomeric sleeve over an object such that the sleeve is tightly contacted to the object. One example is in a heating and/or cooling unit wherein conduits or piping carrying gases or liquids are joined. It is not uncommon for such a system to develop leaks due to the difficulty commonly experienced in achieving a satisfactory seal. The present invention may be used in such a situation by providing a generally tubular sleeve having two open ends, comprising an elastomeric composition selected in accordance with the invention and having internal dimensions in its contracted state less than the external dimensions of the article over which it is desired to seal. It is understood that the dimensions need not be uniform to practice the invention. The sleeve may be expanded using solvents selected in accordance with the invention, and placed over the desired location, whereupon the solvent is allowed to evaporate from the elastomeric composition, causing the sleeve to contract, thereby providing an external sealing function to the conduit or piping. Another advantageous use of the invention is to cover an elongate article exposed to the elements or to other corrosive conditions to prevent corrosion of the article.

The invention will be further described with reference to the following specific Examples. It will be understood that these Examples are illustrative and not restrictive in nature.

EXAMPLE ONE

Making a Golf Club Grip

A swelling solvent is made by combining about 87.0% of ISOPAR C®, about 5.0% of ISOPAR E® and about 8.0% of an HCFC and mixing. A preformed, substantially tubular golf club grip having one open end and one closed end, comprising about 52% ethylene propylene diene monomer ("EPDM"), and having an inside diameter of about 0.570 thousandths of an inch, is contacted with the swelling solvent in a ratio of about 0.9:1 solvent:grip material by weight, where it expands, providing an inside diameter in its expanded state of about 0.620 thousandths of an inch. The grip having solvent absorbed therein is then maintained in an airtight container in a substantial vacuum, thereby preventing the solvent from evaporating from the grip.

EXAMPLE TWO

Attaching a Golf Club Grip to a Golf Club Shaft

An elastomeric grip having solvent absorbed therein is made as described in Example 1 and a grip-receiving portion of a golf club shaft having diameter of about 0.620 thousandths of an inch is then inserted into the recess of the expanded grip such that the end of the golf club shaft within the grip lies substantially adjacent the closed end of the grip. This orientation is then maintained for a sufficient period of time that the solvent evaporates from the elastomeric grip, causing the grip to contract. Although the grip tends to contract to its original size and shape (and, therefore, returning the inside diameter to its original size), the inside surface of the grip contacts the surface of the shaft before the grip reaches its original size and shape. Further evaporation of the solvent from the elatomeric material then causes elastomeric tension in the grip to increase, thereby increasing the tightness of the grip on the shaft. When the solvent is substantially evaporated from the grip, the grip is tightly attached to the shaft and the club is ready for its intended use.

EXAMPLE THREE

Increasing the Tackiness of a Grip While Attaching the Grip to a Shaft

The procedures of Examples 1 and 2 are followed except that the swelling solvent is prepared by combining about 80.0% of ISOPAR C®, about 5.0% of ISOPAR E®, about 7.0% of a polybutene and about 8.0% of an HCFC and mixing.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method for attaching a preformed golf club grip directly onto an outer surface of a golf club shaft, comprising:

providing a golf club shaft comprising a grip-receiving portion positioned at the first end of the shaft and having a predetermined diameter;

providing a generally tubular golf club grip with a first end substantially closed and a second end substantially open; the second end thereby providing access to a recess within the tubular grip, the second end and the recess formed to receive the grip-receiving portion; the recess having an inside diameter at least as large as the diameter of the grip-receiving portion of the shaft; wherein the grip comprises an elastomeric composition having absorbed therein a liquid swelling solvent;

inserting the grip-receiving portion of the golf club shaft into the recess so that the shaft and the grip have an orientation whereby the first end of the grip is substantially adjacent the first end of the shaft; and maintaining the orientation for a period of time which enables the solvent to evaporate from the elastomeric composition, the evaporating causing the elastomeric composition to contract, thereby causing the grip to come into intimate contact with the shaft and to become attached to the shaft by friction between the grip and the shaft.

2. The method according to claim 1, wherein the weight ratio of solvent to elastomer material in the grip is at least about 0.5:1.0.

3. The method according to claim 1, wherein the grip comprises an elastomeric composition having a solubility parameter of from about 7.0 to about 8.4.

4. The method according to claim 1, wherein the grip comprises an elastomeric composition having a solubility parameter of from about 7.2 to about 8.2.

5. The method according to claim 1, wherein the grip comprises an elastomeric composition having a solubility parameter of from about 7.4 to about 8.0.

6. The method according to claim 1, wherein the solvent comprises an isoparaffin and a hydrochlorofluorocarbon.

7. The method according to claim 1, wherein the solvent comprises a polybutene and wherein the polybutene remains within the elastomeric composition after the solvent evaporates therefrom.

8. A method for attaching a preformed golf club grip directly onto an outer surface of a golf club shaft, comprising:

providing a golf club shaft comprising a grip-receiving portion positioned at the first end of the shaft and having a predetermined diameter;

providing a preformed golf club grip having a recess for receiving the grip-receiving portion; wherein the grip comprises an elastomeric composition having absorbed therein a liquid swelling solvent; and wherein the weight ratio of solvent to elastomer material in the grip is at least about 0.5:1.0 placing the grip-receiving portion into the recess; and contracting the grip by evaporating the swelling solvent therefrom, thereby bringing the grip into tight contact with the grip-receiving portion of the shaft.

9. A method for attaching a preformed elastomeric sports grip directly onto a grip-receiving portion of a piece of sports equipment, comprising:

providing a piece of sports equipment comprising a grip-receiving portion, the grip-receiving portion having predetermined outside dimensions;

providing a generally tubular elastomeric sports grip having a substantially open first end; the first end thereby providing access to a grip recess formed to receive the grip-receiving portion; the recess having inside dimensions at least as large as the outside dimensions of the grip-receiving portion; wherein the elastomeric grip has absorbed therein a liquid swelling solvent;

positioning the grip to have an orientation with respect to the grip-receiving portion whereby the grip-receiving portion resides in the recess; and maintaining the orientation for a period of time which enables the solvent to evaporate from the grip, the evaporating causing the grip to contract, thereby causing the grip to come into intimate contact with the grip-receiving portion and to become attached to the grip-receiving portion by friction between the grip and the grip-receiving portion.

10. The method according to claim 9, wherein the piece of sports equipment comprises a member selected from the group consisting of a golf club, a tennis racquet, a racquetball racquet, a badminton racquet, a hockey stick, a baseball bat and a softball bat.

11. The method according to claim 9, wherein the weight ratio of solvent to elastomer material in the grip is at least about 0.5:1.0.

12. The method according to claim 9, wherein the grip has a substantially open second end; the first and second ends providing access to the recess within the grip.

13. The method according to claim 9, wherein the grip has a substantially closed second end.

14. The method according to claim 9, wherein the grip comprises an elastomeric composition having a solubility parameter of from about 7.0 to about 8.4.

15. The method according to claim 9, wherein the swelling solvent has a solubility parameter of from about 5.0 to about 10.4, vapor pressure of at least about 20 mm Hg at 38° C. and a flash point greater than about 0° C.

16. The method according to claim 9, wherein the swelling solvent has a solubility parameter of from about 6.1 to about 9.5.

17. The method according to claim 9, wherein the swelling solvent has a solubility parameter of from 7.2 to about 8.5.

18. The method according to claim 9, wherein the swelling solvent has a flash point greater than about 15° C.

19. The method according to claim 9, wherein the swelling solvent has a flash point greater than about 25° C.

20. The method according to claim 9, wherein the swelling solvent comprises on isoparaffin and a hydrochlorofluorocarbon.

21. The method according to claim 20, wherein the isoparaffin comprises at least about 25% by volume of the solvent and wherein the hydrochlorofluorocarbon comprises up to about 75% by volume of the solvent.

22. The method according to claim 20, wherein the isoparaffin comprises at least about 50% by volume of the solvent and wherein the hydrochlorofluorocarbon comprises up to about 50% by volume of the solvent.

23. The method according to claim 20, wherein the isoparaffin comprises at least about 70% by volume of the solvent and wherein the hydrochlorofluorocarbon comprises up to about 30% by volume of the solvent.

24. The method according to claim 20, wherein the isoparaffin comprises at least about 50% ISOPAR C®.

25. The method according to claim 20, wherein the isoparaffin comprises from about 5% to about 95% ISOPAR C®, and from about 5% to bout 95% ISOPART E®.

26. The method according to claim 20, wherein the swelling solvent comprises form about 5% to about 95% ISOPAR C®, form about 5% to about 95% ISOPAR E® and up to about 30% hydrochlorofluorocarbon.

27. The method according to claim 20, wherein the swelling solvent comprises form about 50% to about 95% ISOPAR C® and from about 5% to about 50% IICFC.

28. The method according to claim 20, wherein the swelling solvent further comprises polybutene.

29. A method for attaching a preformed elastomeric sports grip directly onto a grip-receiving portion of a piece of sports equipment and imparting a tacky feel to the grip, comprising:

providing a piece of sports equipment comprising a grip-receiving portion, the grip-receiving portion having predetermined outside dimensions;

providing a generally tubular elastomeric sports grip having a substantially open first end; the first end thereby providing access to a recess within the grip, the recess being formed to receive the grip-receiving portion;

contacting the grip with a swelling solvent comprising an isoparaffin, a hydrochlorofluorocarbon and polybutene, wherein the swelling solvent is absorbed into the elastomeric grip, thereby swelling the grip such that the recess has inside dimensions at least as large as the outside dimensions of the grip-receiving portion and impregnating the elastomeric grip with polybutene;

positioning the grip to have no orientation with respect to the grip-receiving portion whereby the grip-receiving portion resides in the recess; and maintaining the orientation for a period of time whereby the isoparaffin and the hydrochlorofluorocarbon evaporate from the grip, the evaporating causing the grip to contract, thereby causing the grip to come into intimate contact with the grip-receiving portion and to become attached to the grip-receiving portion by friction between the grip and the grip-receiving portion.

30. The method according to claim 29, wherein the piece of sports equipment comprises a member selected form the group consisting of a golf club, a tennis racquet, a racquetball racquet, a badminton racquet, a hockey stick, a baseball bat, and a softball bat.

31. The method according to claim 29, wherein the weight ratio of solvent to elastomer material in the grip is a least about 0.5:1.0.

32. The method of claim 29, wherein the grip has a substantially open second end; the first and second ends providing access to the recess within the grip.

33. The method according to claim 29, wherein the grip has a substantially closed second end.

34. The method according to claim 29, wherein the grip comprises an elastomeric composition having a solubility parameter of from about 7.0 to about 8.4.

* * * * *

UNITED STATES PATENT AND TRADEMARK OFFICE
CERTIFICATE OF CORRECTION

PATENT NO : 5,909,912
DATED : June 8, 1999
INVENTOR(S) : Bernard K. Mueller

It is certified that errors appear in the above-identified patent and that said Letters Patent are hereby corrected as shown below:

In column 13, line 30, please delete "bout" and insert in lieu thereof --about--.

In column 13, line 30, please delete "ISOPART" and insert in lieu thereof --ISOPAR--.

In column 13, line 32, please delete "form" and insert in lieu thereof --from--.

In column 13, line 33, please delete "form" and insert in lieu thereof --from--.

In column 13, line 36, please delete "form" and insert in lieu thereof --from--.

In column 13, line 37, please delete "IICFC" and insert in lieu thereof --HCFC--.

In column 14, line 27, please delete "form" and insert in lieu thereof --from--.

In column 14, line 32, please delete "a least" and insert in lieu thereof --at least--.

Signed and Sealed this

Tenth Day of April, 2001

*Attest:*

NICHOLAS P. GODICI

*Attesting Officer*   *Acting Director of the United States Patent and Trademark Office*